United States Patent Office 3,165,113
Patented Jan. 12, 1965

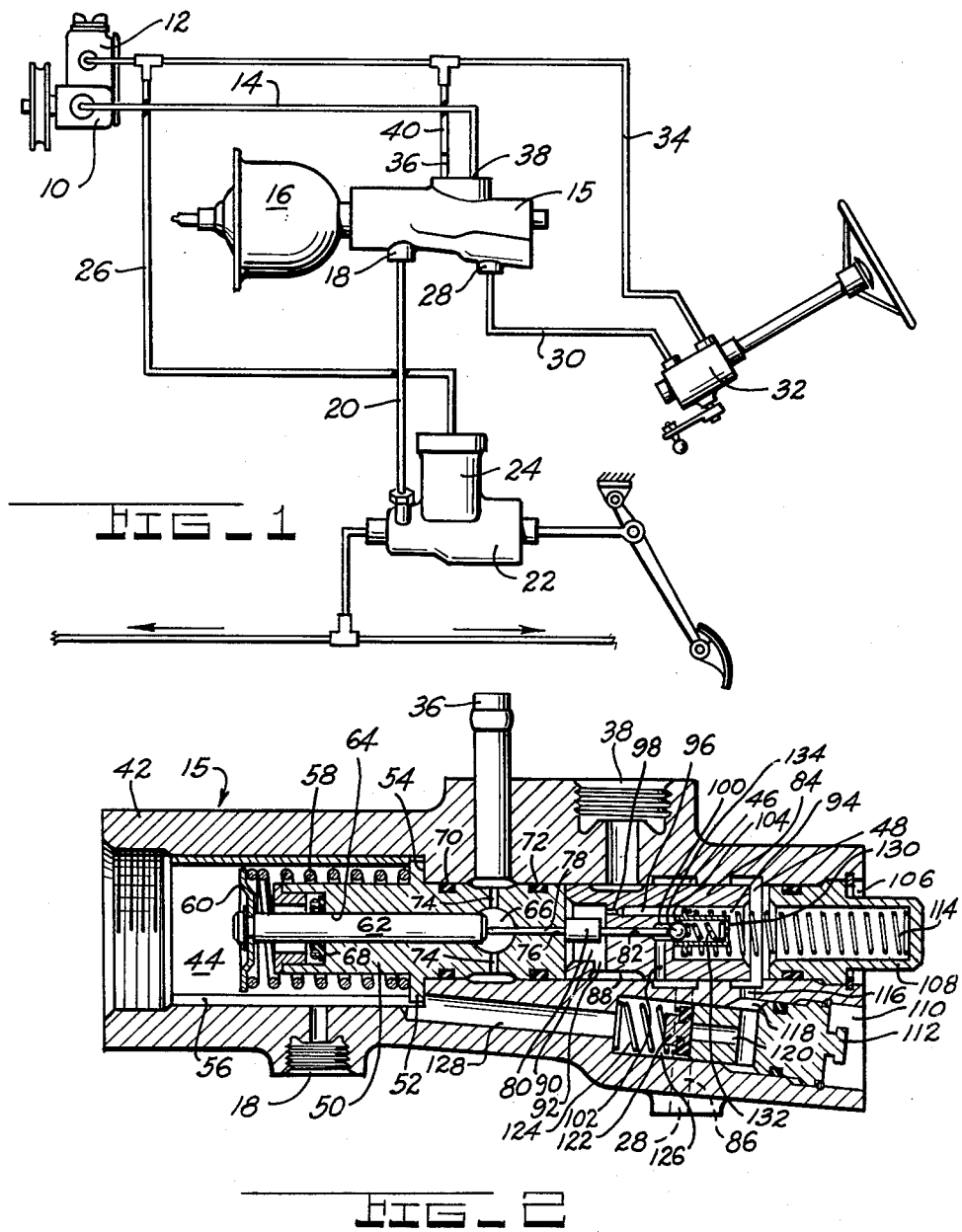
Jan. 12, 1965    H. B. SCHULTZ    3,165,113
COMBINED FLOW DIVIDER AND PRESSURE REGULATOR
Filed Nov. 19, 1962
INVENTOR.
HAROLD B. SCHULTZ
BY
ATTORNEY.

3,165,113
COMBINED FLOW DIVIDER AND
PRESSURE REGULATOR
Harold B. Schultz, South Bend, Ind., assignor to The
Bendix Corporation, South Bend, Ind., a corporation of
Delaware
Filed Nov. 19, 1962, Ser. No. 238,614
4 Claims. (Cl. 137—101)

This invention relates to a full hydraulic power system for all types of vehicles having a need for a simple power system for multiple controls. In more detail, the invention is concerned with a valve which will regulate pressure in said power system and act as a flow divider.

By way of example only, an automotive vehicle control system is described in connection with my invention. This type of vehicle has been incorporating a hydraulic power steering system and an air or vacuum power brake system. It is my intent to provide a single power system such as a simple hydraulic power system common to both a power steering system and a power brake system. Needless to say, previous attempts have been tried, and the result has been shown to be promising providing back pressure on the steering system can be eliminated. A simple device for simply eliminating back pressure in such a system is shown in a copending U.S. application No. 210,071, filed July 16, 1962, assigned to the common assignee. However, it has also become rather apparent that a combined system such as mentioned should also have means to divide a single pressurized flow into separate streams for each system. It is the principal object of this invention, therefore, to provide a combined presure regulator and flow divider in a full hydraulic power system.

It is also an object of this invention to provide a means for insuring flow to all of several components of a full hydraulic system regardless of the pressure in the system.

Another object of this invention is to provide a full hydraulic power system having a means dividing flow into several streams to allow operation of one or all of several control systems simultaneously.

A still further object of this invention is to utilize a single power source to provide power assist to at least two control systems such that each control system receives flow separate from the other.

As may be readily appreciated by those skilled in the art other objects and further advantages may well be accorded to my invention in view of the following description for the accompanying drawings in which:

FIGURE 1 is a schematic presentation of a full hydraulic power system in accordance with my invention; and FIGURE 2 is a sectioned side view of a flow divider pressure regulating valve in accordance with my invention.

In more detail, I show in FIGURE 1 a pump 10 driven by a belt drive connection with an engine (not shown). This pump could be a ball piston type, a vane type, a gear tye, etc., having capacity to supply an adequate pressurized fluid for the varied needs of several systems. In any event the pump is also provided, in my embodiment shown, with a reservoir 12 for storing fluid to replenish system needs whenever necessary.

The pump is shown connected by a conduit 14 to a flow divider, pressure regulating valve 15, to be described hereinafter in more detail. For now this valve can be generally recited to divide the pressurized fluid stream from pump 10 into an accumulator flow and a power steering flow regardless of pressure requirements of either circuit. The accumulator flow is directed to an accumulator 16, which can be of an air pressure type, and this flow is also ported by a port 18 to a conduit 20 connected with a master cylinder 22 whose inner details are fully described by a copending U.S. application No. 226,614, filed September 27, 1962, assigned to the common assignee. This master cylinder is shown to have an integral reservoir 24 connected, as by conduit 26, to the pump reservoir 12. The power steering flow is ported, as at 28, and communicated by conduit 30 to an integral power steering mechanism 32. Fluid discharged from mechanism 32 is returned to reservoir 12 by a conduit 34. As may also be seen in FIGURE 1, my valve 15 is provided with a port 36 adjacent an inlet port 38, which port 36 is connected by conduit 40 to conduit 34 for purposes hereinafter detailed.

The flow divider, pressure regulating valve is more particularly described with reference to FIGURE 2. In detail, a valve housing 42 is divided into three compartments, namely an accumulator chamber 44, a power steering chamber or control chamber 46 and a cross reference chamber 48. Within the accumulator chamber I mount a body 50 having a radial flange 52 such that the flange abuts a shoulder 54 of housing 42 and is held thereagainst by a split sleeve 56. A spring 58 projects from the flange 52 to engage a movable wall 60 to hold wall 60 normally away from the extreme left end of body 50, as seen in FIGURE 2. The wall 60 is provided with a rod 62, and rod 62 is slidably received by a bore 64 in body 50, which bore terminates inwardly of the body 50 in a chamber 66. In order to seal chamber 44 a sliding seal 68 is provided on said body to seal the bore 64 and a pair of O ring seals 70 and 72 are provided around body 50 behind flange 52 where the body is inserted in housing 42. However, chamber 66 is communicated by radial passages 74 to the reservoir port 36 to return any leakage flow to the reservoir 12. Opposite the end of body 50 mounting the pressure responsive wall 60, body 50 is bored, as at 76, to slidably receive a pin 78, which pin 78 extends into chamber 66 to abut with rod 62 extending into the chamber but from the opposite direction. Pin 78 is provided with a boss 80 to limit the inward projection of pin 78 in bore 76, and the pin 78 extends beyond the boss 80 to the right, as seen in FIGURE 2, to slidably project through a bore 82 in a floating piston 84.

The floating piston is slidably received in a bore in the housing 42 adjacent the inlet port 38, which bore terminates in the power steering chamber 46, which power steering chamber is communicated to the power steering port 28 by a passage 86 shown by the dash lines in FIGURE 2. The piston 84 is provided with an annular groove 88 adjacent the inlet port 38, and an internal chamber 90 having a passage 92 leading to the groove 88. Another chamber 94 is provided in piston 84 at the end opposite chamber 90, and the two chambers are connected by a passage 96 having a restricted orifice 98. In addition, bore 82 is counterbored, as at 100, and a radial passage 102 communicates the enlarged bore 100 to the power steering chamber 46. Adjacent the opening of counterbore 100 into chamber 94 of piston 84, a valve seat 104 is provided.

The housing 42 is provided with an upper opening 106 closed by a removable plug 108 and a lower opening 110 closed by a removable plug 112 to allow replacement of defective parts therein. Plug 108 is constructed to provide a mounting base for a spring 114 that projects into chamber 94 of piston 84 bias the piston to the left, as viewed in FIGURE 2, to hold the piston, in absence of forces otherwise, against the body 50. The spring 114 urges piston 84 to the left allowing fluid which has passed through orifice 98 to be discharged to cross reference chamber 48 wherefrom it is directed through radial passage 116 to an annular chamber 118 to a T passageway 120 in plug 112. The T passageway is controlled by a valve 122, shown as a simple poppet valve biased to close T passageway, as by a spring 124 within a chamber 126 behind the plug 112, which chamber is communicated by passage 128 to the accumulator chamber 44.

I also use the spring 114 to hold a valve cage 130 within the piston chamber 94. The valve in turn utilizes a spring 132 to bias a ball valve 134 against seat 104. As may be readily understood by those skilled in the art, the valve cage 130 is appropriately perforated to allow fluid communication from chamber 94 to within cage 130 such that flow is unobstructed therebetween.

In operation, as the engine is running, pump 10 is continually operating to provide fluid to inlet port 38. This fluid, assuming the accumulator 16 is at low charge and movable wall 60 is positioned as seen in FIGURE 2, flows around groove 88 and into chamber 90 to the restricted orifice 98 thence to chamber 94 via passageway 96. Spring 114 is chosen to develop a force to counterbalance the unbalanced hydraulic force cause by pressure drop of a predetermied flow thru orifice 98. This balance condition, of pump pressure in cavity 90 urging valve piston 84 to the right, and the reduced pressure caused by a predetermined flow through orifice 98 plus the force of spring 114 urging the plunger to the left, will cause the main flow to pass to the steering gear and the small remaining flow to pass to the accumulator via passage 128 and the opening in split ring 56. This flow division will be maintained in response to the above described balance of forces regardless of the pressure requirement of the steering system or the accumulator system until overruled by movement of plunger 62 to the right in response to maximum desired accumulator pressure. Any change in the predetermined accumulator pressure will change the pressure unbalance which will cause piston 84 to shift to a position to restrict flow to the low pressure circuit and re-establish the unbalanced pressure forces and the load of spring 114.

However, upon reaching the selected accumulator pressure, movement of rod 62 to the right, as above mentioned, causes the unseating of ball valve 134, upsetting the balance forces on piston 84 and moving it to the right, as boss 80 abuts it, to overcome the load of spring 114. All flow to the accumulator is now cut off and directed to the power steering circuit under whatever pressure it requires until the accumulator pressure drops to its low limit.

While the above embodiment is described with reference to a steering and braking system of a vehicle it is to be understood that such a system as mine may also be found in aircraft control systems such as aileron boost and landing gear retraction systems. I, therefore, do not intend to be limited by the above description but rather to the constructions and arrangements as set forth in the appended claims which truly set forth the scope and spirit of my invention.

I claim:
1. A valve means comprising:
    a housing having an inlet port, an accumulator port, an accumulator chamber, a cross reference chamber, a control chamber, a passage communicating said accumulator chamber and said cross reference chamber, a first control port open to said accumulator chamber and a second control port open to said control chamber;
    a floating piston in said housing arranged to separate said cross reference chamber and said control chamber and control communication between said inlet port and said control chamber, said piston having a first internal chamber open to said inlet port with a restricted passage between said first internal chamber and said cross reference chamber, said piston also having a second internal chamber with an opening to said cross reference chamber and said control chamber;
    a valve operatively arranged in said opening of said second internal chamber to control fluid flow between said cross reference chamber and said control chamber via said second internal chamber;
    a means responsive to accumulator chamber pressure to controll said valve, which, means is provided with a boss arranged to move said piston when said valve is opened to increase communication between said inlet port and said control chamber and, by opening said valve, to unload pressure in said cross reference chamber to said control chamber; and
    means a yieldably position said piston to close off communication of said inlet port and said control chamber in the absence of a pressurized fluid being supplied to said inlet port.

2. A valve means according to claim 1 and further comprising a pressure responsive valve in said passage of said housing arranged to open communication between said cross reference chamber and said accumulator chamber whenever pressure in the former is greater.

3. A valve means according to claim 2 wherein said piston is provided with means to variably restrict communication between said second internal chamber and said cross reference chamber to balance said piston and prevent any complete closing of communication to said cross reference chamber.

4. A valve means in accordance with claim 1 and further comprising a leakage collection chamber; and
    a radial passage means communicating said leakage collection chamber with a reservoir port in said housing to return leakage accumulations to a reservoir.

References Cited in the file of this patent
UNITED STATES PATENTS

| | | |
|---|---|---|
| 2,737,196 | Eames | Mar. 6, 1956 |
| 2,793,498 | Banker | May 28, 1957 |
| 2,956,405 | Spalding et al. | Oct. 18, 1960 |
| 3,011,506 | Schwartz et al. | Dec. 5, 1961 |
| 3,099,284 | Thrap et al. | July 30, 1963 |

UNITED STATES PATENT OFFICE
CERTIFICATE OF CORRECTION

Patent No. 3,165,113 January 12, 1965

Harold B. Schultz

It is hereby certified that error appears in the above numbered patent requiring correction and that the said Letters Patent should read as corrected below.

Column 2, line 63, before "bias" insert -- to --; column 4, line 22, for "controll" read -- control --; line 28, for "a" read -- to --.

Signed and sealed this 29th day of June 1965.

(SEAL)
Attest:

ERNEST W. SWIDER
Attesting Officer

EDWARD J. BRENNER
Commissioner of Patents